No. 843,790. PATENTED FEB. 12, 1907.
R. G. BEKER.
UPSETTING MACHINE.
APPLICATION FILED JUNE 6, 1904.

WITNESSES: INVENTOR

No. 843,790. PATENTED FEB. 12, 1907.
R. G. BEKER.
UPSETTING MACHINE.
APPLICATION FILED JUNE 6, 1904.

WITNESSES:

INVENTOR
Rudolph G. Beker

No. 843,790. PATENTED FEB. 12, 1907.
R. G. BEKER.
UPSETTING MACHINE.
APPLICATION FILED JUNE 6, 1904.

WITNESSES:
J. R. Keller
G. C. Raymond

INVENTOR
Rudolph G. Beker,
By Kay, Totten & Winter,
His Attys.

No. 843,790. PATENTED FEB. 12, 1907.
R. G. BEKER.
UPSETTING MACHINE.
APPLICATION FILED JUNE 6, 1904.

WITNESSES
J. R. Keller
G. C. Raymond

INVENTOR
Rudolph G. Beker
By Kay, Totten & Winter
His Attys

No. 843,790. PATENTED FEB. 12, 1907.
R. G. BEKER.
UPSETTING MACHINE.
APPLICATION FILED JUNE 6, 1904.

WITNESSES:
J. R. Keller
G. C. Raymond

INVENTOR
Rudolph G. Beker
By Kay, Totten & Winter,
His Attys.

No. 843,790. PATENTED FEB. 12, 1907.
R. G. BEKER.
UPSETTING MACHINE.
APPLICATION FILED JUNE 6, 1904.

WITNESSES
J. R. Keller
G. C. Raymond

INVENTOR
Rudolph G. Beker
By Kay, Totten & Winter,
His Attys.

UNITED STATES PATENT OFFICE.

RUDOLPH G. BEKER, OF PITTSBURG, PENNSYLVANIA, ASSIGNOR TO CARL SCHMIDT, OF CLEVELAND, OHIO.

UPSETTING-MACHINE.

No. 843,790.  Specification of Letters Patent.  Patented Feb. 12, 1907.

Application filed June 6, 1904. Serial No. 211,315.

*To all whom it may concern:*

Be it known that I, RUDOLPH G. BEKER, a resident of Pittsburg, in the county of Allegheny and State of Pennsylvania, have invented a new and useful Improvement in Upsetting-Machine; and I do hereby declare the following to be a full, clear, and exact description thereof.

My invention relates to metal-upsetting machines in which hot metal rods are automatically fed, cut into exact lengths, and then upset for the purpose of forming rivets, bolt-blanks, pins, and the like.

The present invention embodies improvements upon the subject-matter of my United States Patents Nos. 733,898 and 751,141. Its object is to improve the various mechanisms of such machines so as to not only make practically perfect upset articles, but to do so continuously.

The general plan of the machine is not materially different from that shown in my patents above named, and it is designed to make a plurality of articles simultaneously. It has been improved by adding thereto a knockout or ejector for each of the plurality of articles, providing a separate adjustable stop-gage for each of the articles, providing removable and renewable wearing-faces for said gages, providing a rocking chute for delivering the articles from the machine, providing means for giving a bend to the end of the stock-rod so that the upset head will be concentric, improving the feed mechanism so as to prevent binding of the stock-rods, to relieve feeding-friction on the stock-rod while being cut, to prevent vibration or jumping of the feed-rollers, and to enable the instantaneous separation of the feed-rollers, as well as improving such machines in details of construction, all as will hereinafter be described.

In the accompanying drawings.

Figure 1:
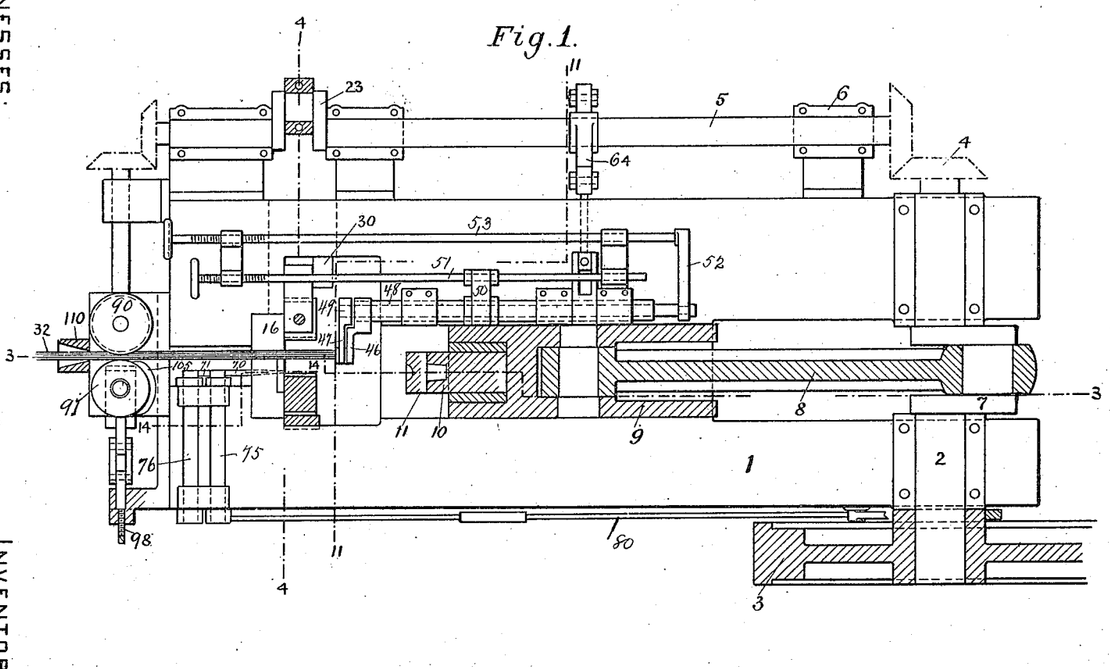
Figure 1 is a plan view, partly in section, of my improved machine.
Figure 2:
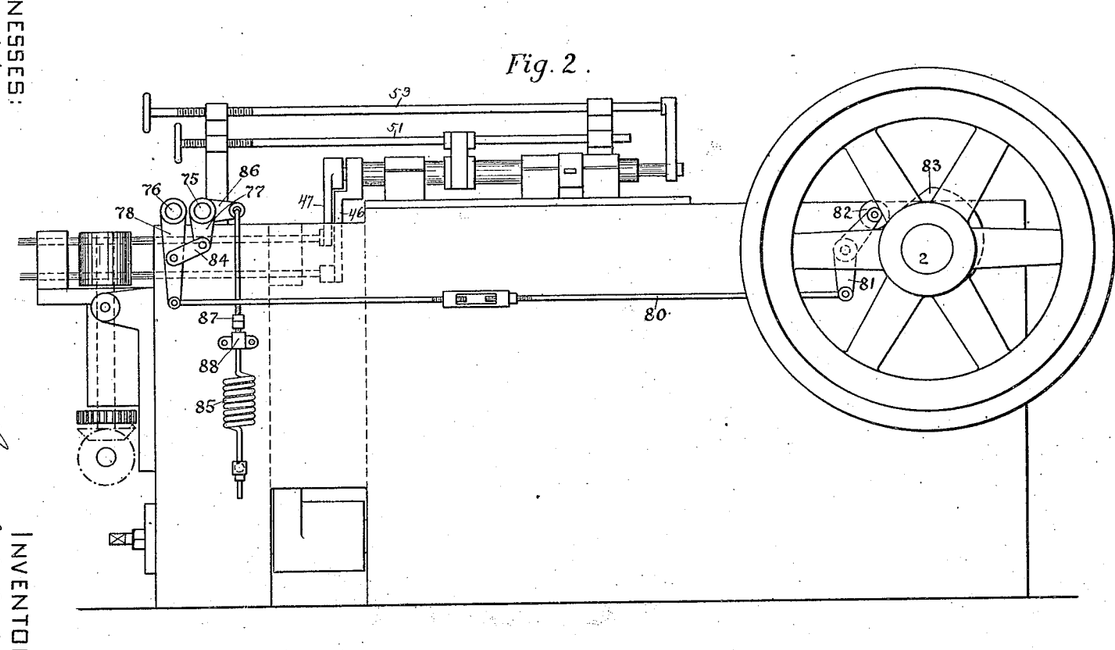
Fig. 2 is a side view of the same.
Figure 3:
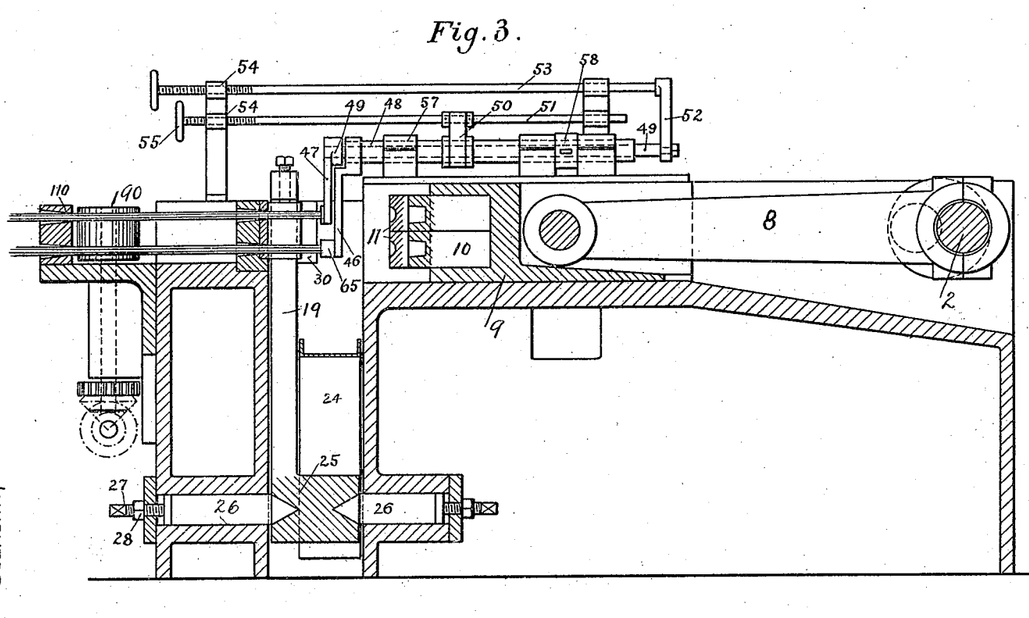
Fig. 3 is a longitudinal vertical section on the line 3 3, Fig. 1.
Figure 4:
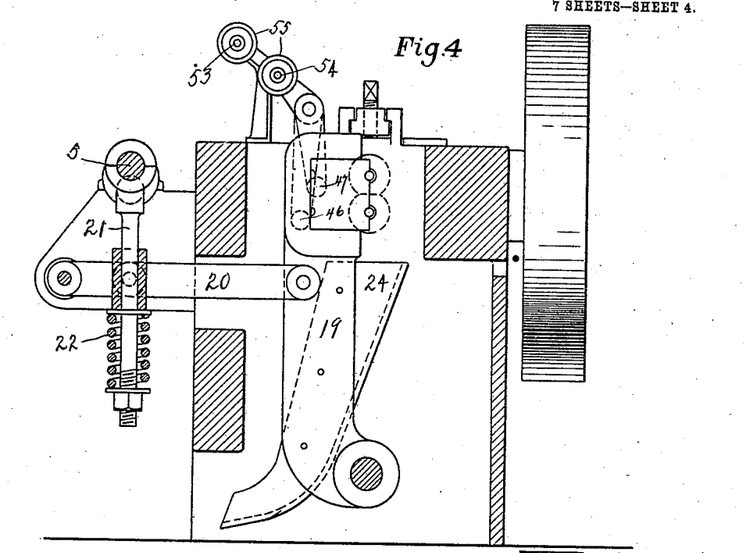
Figs. 4 and 5 are transverse vertical sections on the line 4 4, Fig. 1, showing different positions of the parts.
Figure 5:
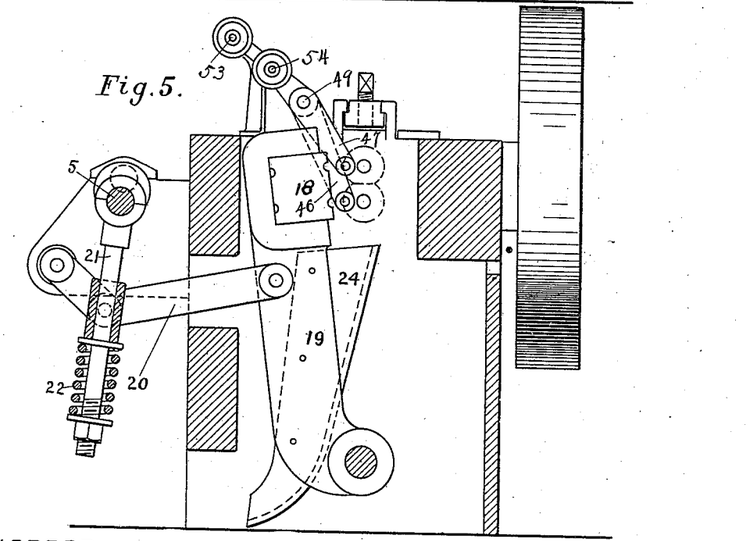
Figure 6:
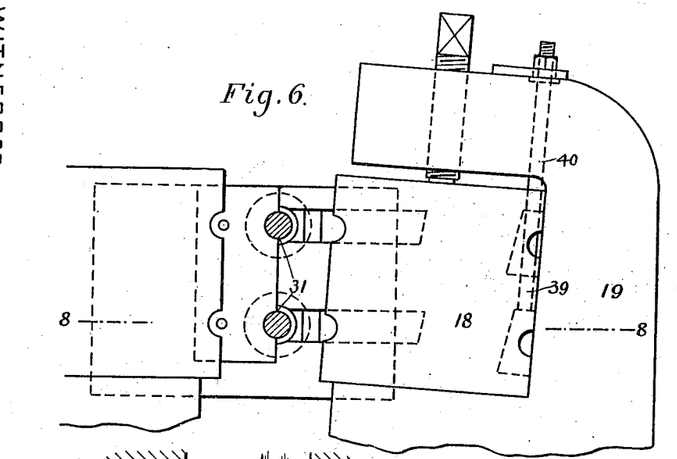
Figs. 6 and 7 are enlarged face views of the cutting and gripping dies, showing the bending means and the parts in different positions.
Figure 7:
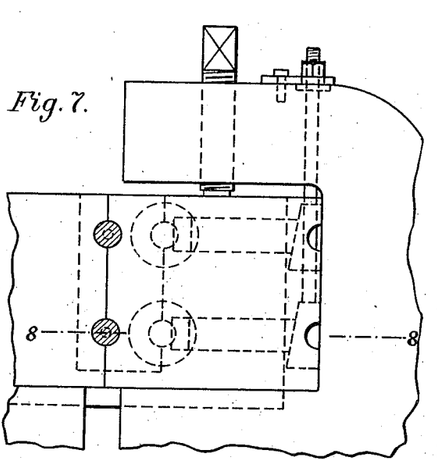
Figure 8:
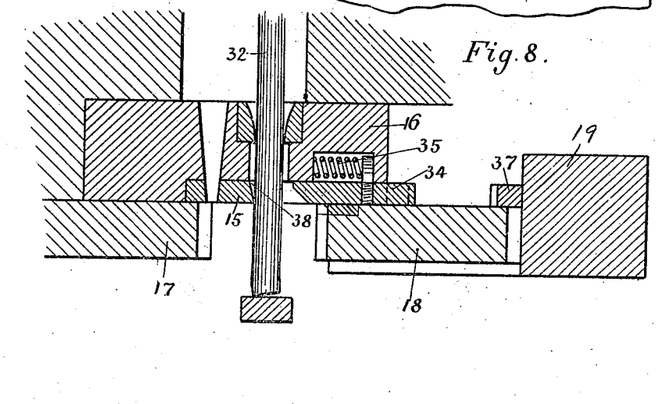
Figs. 8 and 9 are horizontal sections taken on the lines 8 8 on Figs. 6 and 7, respectively.

The machine is provided with a suitable frame 1, in or on which all of the working parts are mounted. In the rear end of this frame is mounted the main or driving shaft 2, which may be driven in any suitable way, as by means of the belt-pulley 3. The driving-shaft is connected by bevel-gears 4 to a longitudinal counter-shaft 5, mounted in bearing-brackets 6 on the side of the frame 1. The driving-shaft is provided with a crank 7 or equivalent means, on which works one end of a connecting-rod 8, the other end of which is hinged to the slide or head 9. This head is mounted to reciprocate in suitable ways in the machine-frame and on its forward end is provided with a socket for receiving the upsetting or heading tools or punches 10. A plurality of such tools are employed arranged vertically, as shown in Fig. 3. These tools must have hard wearing-faces and must be of forged steel. In hardening them it has been found that they warp, and thus get out of true shape. To overcome this difficulty, I make the body of ordinary steel and provide a separate hardened working face 11. This may be secured to the body in any suitable manner, such as providing it with a projection 12, fitting in the socket in the end of the tool-body. As the face 11 is comparatively short, it will not warp during hardening, and hence the tool will be perfectly true. Further, when the face becomes damaged it can be renewed without throwing away the entire tool.

The stationary shearing-die 15 is mounted on the breast-plate 16, and the stationary gripping-die 17 is suitably mounted in the frame of the machine, while the movable shearing and gripping die 18 is carried by a rocker-arm 19, which is actuated by toggle-links 20, connecting-rod 21, spring 22, and crank 23 on shaft 5. This part of the machine is the same as in my prior patent, No. 733,898.

To the rocker-arm 19 is secured a chute 24, into which the upset articles fall and by which they are delivered from the machine. As this chute rocks or oscillates with the arm 19 the articles will be shaken out and cannot clog in the machine.

The rocker-arm is mounted on adjustable bearings, these comprising conical sockets 25 in opposite faces of the arm and into which project the conical ends of studs 26, which are adjustable by suitable bolts 27 and lock-nuts 28. By these means all wear can be taken up, the arm accurately positioned, all lost motion or wabbling prevented, and steadiness of movement insured.

In shearing the stock-rod there is liability of the rocker-arm yielding, thus permitting the movable die to spring away from the stationary die. This results not only in defective cuts, but also in the rapid wearing away of the cutting edges of the die. The adjustable bearings above described in a larger measure prevent the evil just described; but to absolutely prevent the same I provide a guide or abutment 30, fixed on the frame in any suitable way, so as to be rigid and bearing against the rear face of the upper end of the rocker-arm. This guide will be so positioned as to allow the rocker-arm to freely slide over the same, but will absolutely prevent said arm from springing away from the stationary die while shearing.

Figure 9:
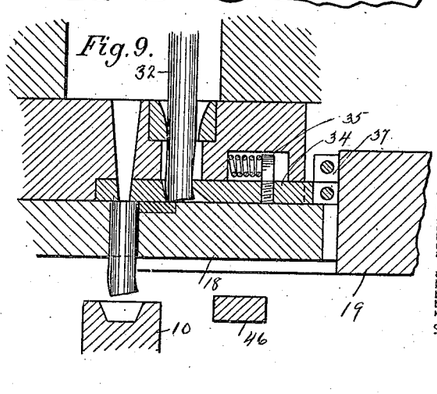
Figures 10, 10A, 12, 13, 14, 15:
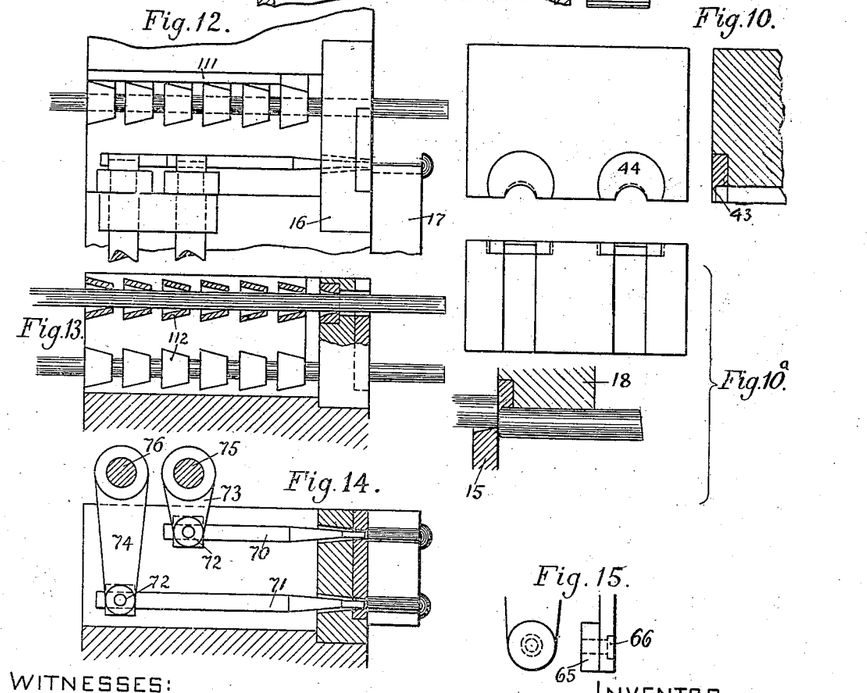
Figs. 10 and 10ª show the cutting-dies and their manner of cutting.
Figs. 12 and 13 are respectively a vertical section and a plan view of the guide-funnels.
Fig. 14 is a vertical section on the line 14 14, Fig. 1, showing the ejectors.
Fig. 15 is a detail view of the removable wearing-faces of the stop-gages.
Figure 11:
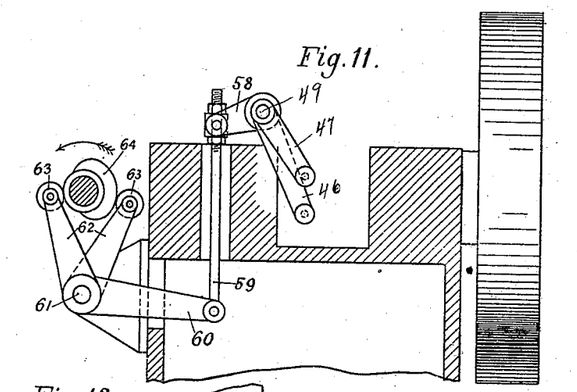
Fig. 11 is a transverse section on the line 11 11, Fig. 1, showing the actuating means for the stop-gages.

The shearing-dies shown are provided with two shearing-cavities 31, so as to operate on two stock-rods 32. The shearing-dies do not cut squarely across the stock-rod and also have a tendency to crowd the metal to one side of the rod. As a consequence when this end is upset the head of the article will not be symmetrical, but will be somewhat eccentric to the axis of the article. To overcome this, I provide means for giving a slight bend to the front end of the stock-rod, so as to throw the metal in the opposite direction from that in which it was crowded by the shearing-dies, so that when the end is upset the metal will be so distributed as to form a concentric head. To accomplish this, the stationary shearing-die is provided with a beveled face 38, which slopes away from the outer edge thereof, and the breast-plate is provided with a projection formed, preferably, by a bushing $16^a$, so that the stock-rod on one side will have a support at two points. In connection therewith I provide a bender 34, slidably mounted in the breast-plate 16 and normally held retracted by means of a spring 35, seated in a cavity in the breast-plate and bearing against a stud on the bender. The front end of this bender is beveled, as shown in Figs. 6 to 9. Carried by the rocker-arm 19 is an abutment 37, which is so aranged that at the limit of movement of the shearing-die it will contact with the rear end of the bender and push the same forward to contact with the stock-rod intermediate and on the opposite side of the two points of support $16^a$ and 38 and to crowd the same sidewise into the space between said two points of support. As a result the end of the rod will be slightly bent, as shown in Fig. 9, and the metal so distributed with reference to the axis of the rod that when upset the head will be symmetrical and concentric.

A bender is provided for each of the shearing-cavities 31. As a consequence two abutments 37 are carried by the rocker-arm. These abutments are wedge-shaped and independently adjustable by means of threaded rods 39 and nuts 40, so that they can be moved in order that each bender 34 will be given just the right amount of movement.

The edge of the movable shearing-die is liable to become rounded. As a consequence the die instead of cutting squarely across the stock-rod will crowd the metal sidewise, the forward end of the stock-rod being crowded inwardly on the side where the movable die first contacts with it and having a fin formed on its opposite side. As a result when said end of the stock-rod is upset the head will not be symmetrical or will have more metal on one side than on the other. To prevent this difficulty, I provide the shearing-die on the face next to the breast-plate with a sharp projecting edge 43, which will cut into the metal and cause the stock-rod to be sheared off square. As this projecting edge 43 wears somewhat rapidly, I form it on a separate bit 44 of hardened steel, which is set into the die-body so that when worn it can be removed without discarding the entire die.

A pair of stop-gages are provided, one for each stock-rod, and these are independently adjustable in order that all the articles may be of the same length. This is necessary because it is practically impossible to have both stock-rods of exactly the same diameter or heat, so that if a single gage were used the articles after cooling would be of different lengths. I therefore provide two gages, so that their positions may be independently varied according to the heat or character of stock-rod. These gages 46 and 47 are mounted on the ends, respectively, of a tube or sleeve 48 and a rod 49, passing through said sleeve. The rod is movable endwise in the sleeve; but means such as a spline or a pin and slot are provided to cause the two to oscillate together. The sleeve 48 has connected thereto an arm 50, to which is rotatably connected the adjusting-rod 51, and the rod 49 has secured to its rear end an arm 52, which has connected thereto the adjusting-rod 53. The rods 51 and 53 are threaded and pass through threaded stationary sleeves or nuts 54 and are provided with hand-wheels 55 or other means for rotating the same. By these means the two stop-gages can be independently moved longitudinally.

The tube 48 is rotatably mounted in suitable bearings 57 on the frame. It also has secured thereto an arm 58, which is connected by means of a rod 59 to an arm 60 of a three-armed lever, pivoted at 61 in suitable brackets on the side of the machine-frame. The other two arms 62 of this three-armed lever are provided with antifriction-rollers 63, which bear on opposite sides of a cam 64 on the counter-shaft 5. Two arms 62 are provided, so that the cam will positively move the gages in both directions, and the rollers 63 are both always in contact with the cam, so that no lost motion occurs. The cam serves to oscillate the gages so as to bring them first into the path of the stock-rods and then move them to one side, so as to be out of the way of the heading-tools.

The ends of the stop-gages 46 and 47 are provided with renewable wearing-disks or faces 65, which are removably secured to the ends of said gages by any suitable means—such as the bolt or screw 66. If these disks become worn or battered, they can be readily renewed.

The ejector mechanism comprises a pair of bars 70 and 71, projecting through holes in the breast-plate and connected at their outer ends by means of swivel connections 72 to the ends of arms 73 and 74, respectively, which in turn are secured to short transverse shafts 75 and 76, rotatably mounted in suitable bearings on the machine-frame. The outer ends of these shafts are provided with depending actuating arms or cranks 77 and 78, respectively. The arm 78 is connected by means of an adjustable connecting-rod 80 to a pivoted lever 81, having a roller 82, which bears against a cam 83 on the main shaft 2. The cam 83 serves to rock the arm 78. The arm 77 is connected to the arm 78 by means of a link 84 and is rocked thereby. The ends of the link 84 are connected to the arms 77 and 78 different distances from the centers of the shafts 75 and 76, these distances being proportional to the length of the arms 73 and 74. As a consequence both ejector-bars are moved through the same distance and are actuated simultaneously. These ejector-bars are normally held retracted by means of a spiral spring 85, having one end secured to the machine-frame and its opposite end connected to an arm 86 on the shaft 75. An adjustable stop is provided to prevent the spring from drawing the ejector-bars entirely out of the holes in the breast-plate. This stop is shown as a nut 87 on the spring and arranged to engage a stop 88 on the frame.

The feed-rollers 90 and 91 are secured, respectively, to the upper ends of shafts 92 and 93, mounted to rotate in suitable bearings 94 and 95, respectively. The shaft 92 is mounted in stationary bearings, while the shaft 93 is pivoted at its lower end, and the bearing 95 is movable. To the latter is hinged one end of the toggle-links 96, the opposite end of which is hinged to a member 97, adjustable toward and from the bearing 95 by a screw 98 or other means. By this means the amount of pressure that can be exerted by the toggle-links can be varied.

To the knuckle of the toggle-links is secured an adjustable rod 100, provided with a counterweight 101, spring 102, and foot-lever 103. The weight and spring act to keep the toggle-links straightened and hold the feed-rolls in contact, while by means of the foot-lever the toggle-links can be flexed to separate the feed-rollers when it is desired to stop the further feeding of the stock-rods. By means of the toggle-links the rollers can be almost instantly separated—an important matter when anything goes wrong with the machine. The counterweight 101 is not absolutely necessary, as a sufficiently-strong spring can be used to take the place of the weight and spring shown. The spring, however, cannot be dispensed with, as it serves to keep the weight from jumping from the rebound that takes place when the rollers come into contact after each separation.

The separation of the feed-rollers occurs at regular periods. When the shearing-dies begin to act on the stock-rods, it is desirable to stop the forward motion of the latter in order to relieve the dies of all side pressure. To this end the roller 91 is provided with a projecting cam portion 105, which is adapted to bear against the roller 90 and separate the two sufficiently to release their grip on the stock-rods. The rollers, their driving means, and the cam 105 are so designed that said rollers will feed forward a sufficient length of stock for the longest article intended to be made on the machine before said rollers are separated by the cam 105. For shorter articles the rollers will have to slip on the stock-rods for a short time before they are separated.

The roller 91 is mounted to oscillate on its shaft, as described in my Patent No. 751,141, in order that the rollers will grip with equal pressures two stock-rods of unequal sizes. In the present case this is accomplished by giving the roller a straight bore and providing the upper end of the shaft with a double tapered portion 104, on which the roller can oscillate. In my former patent both rollers are provided with a pair of feeding-grooves. I have discovered that when the oscillating roller moves the grooves in the two rollers will no longer match. This causes the stock-rods to bind and interferes with or entirely prevents their forward movement. In the present case I have provided grooves 106 on only one of the rollers, preferably on the roller 90, while the oscillating roller 91 has flat or substantially flat feeding-faces. As a result the stock-rods if of unequal size will not bind in the rollers.

Figure 16:
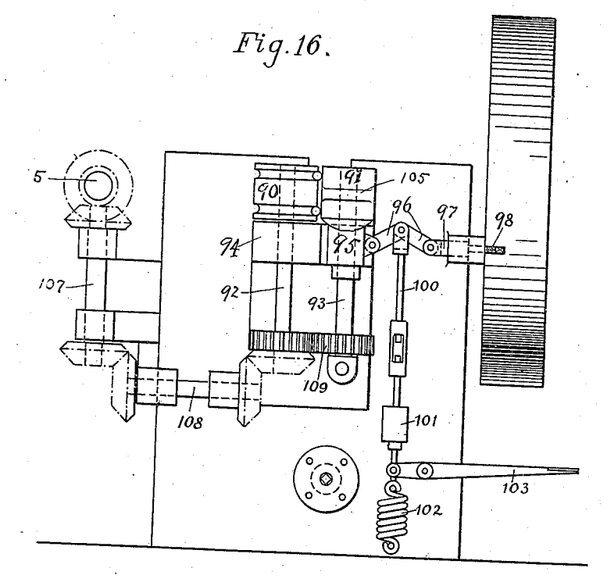
Fig. 16 is an end view showing the feeding mechanism.
Figure 17:
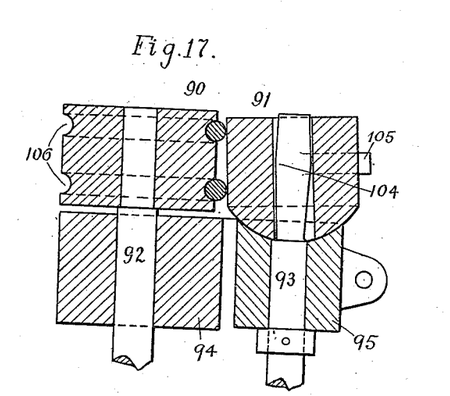
Fig. 17 is a vertical section of the feed-rollers.

The feed-rollers are driven from the shaft 5 by means of short shafts 107 and 108 and suitable bevel-gears, as shown in Fig. 16. The roller-shafts 92 and 93 are connected by spur-gears 109. Various other driving means will suggest themselves.

In front of the feed-rollers are guide-funnels 110, and between the rollers and breast-plate are the guides 111, each comprising a series of short funnels 112, suitably secured together and forming practically continuous guides. The openings through these guides are less than twice the diameter of the stock-rods, so that the forward end of a new stock-rod will push along the rear end of the preceding rod in order that the latter can be entirely worked up and waste avoided. The scale and cinder will readily fall out of the series of funnels 112, thus preventing clogging or choking, as is the case with tubular guides.

In the operation of the machine the stock-rods will be fed by the rollers 90 91 until they strike toe stock-gages. The cam projection 105 on the roller 91 will then or shortly thereafter contact with the roller 90, thus separating the two sufficiently to release their grip on the stock-rods. This relieves the shearing-die of the pushing effect of the rods. As soon as the cam 105 passes the rollers will be again brought into contact by means of the weight 101 and the spring 102, thus again feeding the stock-rods forward. Should anything go wrong with the machine, the forward feeding of the stock-rods can be instantly stopped by means of the treadle 103 acting through the toggle-links 96. The stop-gages 46 and 47 being independently adjustable can be moved to such positions as to insure all of the articles being of exactly the same length even though the diameters and heat of the two stock-rods be different. Said gages, furthermore, are positively moved in both directions by means of the cam 64 and three-armed lever 60, so that it is always certain that they will be in proper position to gage the stock-rod and then out of the path of the upsetting-punches. The adjustment of these gages, furthermore, can be accomplished without stopping or interfering with the regular operation of the machine. The ejectors 70 and 71 will push the upset articles out of the gripping-dies should they stick therein. The funnels between the feeding-rollers and shearing-dies absolutely guide the stock-rods and enable one stock-rod to push forward the end of the succeeding one, thus diminishing scrap, and at the same time said funnels allow the ready escape of all scale and cinder, so that the guides cannot become clogged. The mounting of the oscillating arm 19 on adjustable conical bearings enables all wear and lost motion to be taken up, while the abutment 30 prevents said arm from springing away from the stationary shearing-die, thus insuring a good cut and preventing the wearing away of the shearing-die. The bender 34 at each operation of the rocking arm carrying the shearing-die will crowd the end of the stock-rod over against the beveled face of the stationary die, thus giving it a slight bend and throwing the metal over to one side of the axis, so that the head to be formed thereon will be concentric with the axis. The movable shearing-die as well as upsetting-punches are so constructed that the working faces thereof can be readily renewed and without the necessity of discarding the entire tools. The upset articles fall down in the chute 24, and as the latter rocks with the arm 19 said articles are shaken out of the machine and cannot clog the same.

The several details of construction greatly improve machines of this character and insure the making of symmetrical articles of exactly uniform size and also insure the continuous operation of the machine for this purpose.

Many of the details of construction may be changed within wide limits without departing from the spirit of my invention.

What I claim is—

1. In a metal-upsetting machine, the conbination with shearing and gripping dies and an upsetting-punch, of a pair of positively-driven feed-rollers mounted on vertical shafts, a rocker bearing at the lower end of one of said shafts, toggle-links connected to the upper end of said shaft, means tending to hold said toggle-links straight to keep the rollers in contact, and means for flexing said links.

2. In a metal-upsetting machine, the combination with shearing and gripping dies and an upsetting-punch, of a pair of positively-driven feed-rollers mounted on vertical shafts, a rocker bearing at the lower end of one of said shafts, toggle-links connected to the upper end of said shaft, a spring connected to said links and tending to hold them straight, and a lever for flexing said links.

3. Feeding mechanism for upsetting and like machines comprising a pair of positively-driven rollers, movable bearings for one of said rollers, a cam extending partly around one of said rollers and arranged to engage the other roller to separate the same, and means for holding said rollers normally in contact.

4. Feeding mechanism for upsetting and like machines, comprising a pair of positively-driven rollers, movable bearings for one of said rollers, a cam extending partly around one of said rollers and arranged to engage the other roller to separate the same, and a spring for normally holding said rollers in contact.

5. Feeding mechanism for upsetting and like machines comprising a pair of positively-driven rollers, movable bearings for one of said rollers, toggle-links connected to said bearings, a spring connected to said toggle-links and tending to hold the same straightened, and a cam extending partly around one of said rollers and arranged to engage the other roller to separate the same.

6. Feeding mechanism for upsetting and like machines comprising a pair of positively-driven rollers, a movable bearing for one of said rollers, toggle-links having one end connected to said movable bearing and their opposite end connected to an adjustable support, means tending to normally straighten said links and thereby to hold the rollers in contact, and a lever for flexing said links.

7. Feeding mechanism for upsetting and like machines comprising a pair of rollers, and means for driving said rollers, one of said rollers being provided with a pair of feeding-grooves and the other with plain feeding-faces and one of said rollers being so mounted as to oscillate about a point intermediate its ends to vary its axial position with reference to the other roller.

8. Feeding mechanism for upsetting and similar machines comprising a pair of rollers one of which is provided with a pair of feeding-grooves and the other with plain feeding-faces, driven shafts on which said rollers are mounted, said shafts being movable toward and from one another, one of said rollers having an enlarged bore, and an annular projection on the shaft bearing against the roller-bore at one point only whereby the axial position of the roller with reference to the other roller can be varied.

9. Feeding mechanism for upsetting and similar machines comprising a pair of rollers one of which is provided with a pair of feeding-grooves and the other with plain feeding-faces, and driven shafts on which said rollers are mounted, said shafts being movable toward and from one another and one of said shafts being provided with a double conical portion whereby it bears against the roller-bore at its central portion only.

10. In a metal-upsetting machine, the combination with an upsetting-punch, of a stationary shearing and gripping die, a movable shearing and gripping die, a rocker-arm on which the latter is mounted, mechanism for rocking said arm, and a chute secured to said rocker-arm and in position to receive the upset articles and deliver the same from the machine.

11. In a metal-upsetting machine, the combination with stationary and movable shearing and gripping dies each having a plurality of gripping-recesses, means for opening and closing said dies, a reciprocating head, a plurality of upsetting-punches carried thereby, two stop-gages movable as an integer into and out of the path of the punches but being independently adjustable toward and from the dies, mechanism for simultaneously moving said gages into and out of the path of the punches, two independent adjusting means, one for each gage, and independent connections from the outside of the machine to each of said adjusting means for imparting movement thereto.

12. In a metal-upsetting machine, the combination with stationary and movable shearing and gripping dies having a plurality of gripping-recesses, means for opening and closing said dies, a reciprocating head, a plurality of upsetting-punches carried thereby, two stop-gages movable as an integer into and out of the path of said punches but being independently adjustable toward and from the dies, two independent adjusting means, one for each gage, and two actuating devices, one connected to each adjusting means and being so mounted as not to partake of the movement of said gages, whereby the gages can be adjusted independently and without stopping the machine.

13. In a metal-upsetting machine, the combination with stationary and movable shearing and gripping dies having a plurality of gripping-recesses, means for opening and closing said dies, a reciprocating head, a plurality of upsetting-punches carried thereby, a plurality of stop-gages mounted concentrically and angularly movable, independent mechanism for adjusting said gages toward and from the dies, and mechanism for simultaneously moving said gages angularly.

14. In an upsetting-machine, the combination of shearing and gripping dies having a plurality of gripping-recesses, means for opening and closing said dies, a reciprocating head carrying a plurality of upsetting-punches, a plurality of stop-gages, a rocking bar on which one of said gages is mounted, a sleeve encircling said bar and on which the other gage is mounted, and independent means for adjusting said sleeve and bar longitudinally.

15. In an upsetting-machine, the combination of a pair of shearing and gripping dies provided with a plurality of gripping-recesses, means for opening and closing said dies, a reciprocating head carrying a plurality of upsetting-punches, a sleeve and a bar passing through the same arranged to have independent longitudinal movement and simultaneous rotary movement, independent means for adjusting the same longitudinally, means for rocking the same, and a stop-gage carried by each of said bar and sleeve.

16. In an upsetting-machine, the combination with the plurality of shearing and gripping dies and upsetting-punches arranged to operate simultaneously on a plurality of articles, mechanism for actuating the same, a pair of ejectors, a pair of rock-shafts, arms on said shafts of different lengths and connected to said ejectors, actuating arms or cranks on said shafts, and a link connecting said actuating-arms and attached thereto at distances from the centers of the rock-shaft proportional to the length of the arms carrying the ejectors.

17. In a metal-upsetting machine, the combination with the shearing and gripping dies, of feed-rollers, and a guide between said rollers and dies, said guide comprising a series of funnels placed in line with each other, whereby scale and the like can escape.

In testimony whereof I, the said RUDOLPH G. BEKER, have hereunto set my hand.

RUDOLPH G. BEKER

Witnesses:
MARGARET C. KEEBLE,
G. C. RAYMOND.